United States Patent
Sawada (10) Patent No.: US 8,111,278 B2
(45) Date of Patent: Feb. 7, 2012

(54) IMAGE FORMING APPARATUS, CONTROL METHOD THEREOF AND PROGRAM THEREOF

(75) Inventor: Koichi Sawada, Tokyo (JP)

(73) Assignee: Konica Minolta Business Technologies, Inc. (JP)

( * ) Notice: Subject to any disclaimer, the term of this patent is extended or adjusted under 35 U.S.C. 154(b) by 784 days.

(21) Appl. No.: 12/166,597

(22) Filed: Jul. 2, 2008

(65) Prior Publication Data

US 2009/0021802 A1  Jan. 22, 2009

(30) Foreign Application Priority Data

Jul. 18, 2007  (JP) .................................. 2007-186742

(51) Int. Cl.
 *B41J 27/00* (2006.01)
(52) U.S. Cl. ........................................................ 347/261
(58) Field of Classification Search .................. 347/229, 347/231, 233, 234, 248, 259–261, 243
See application file for complete search history.

(56) References Cited

U.S. PATENT DOCUMENTS 7,612,928 B2 * 11/2009 Tomita ........................ 359/204.1
2008/0304845 A1 * 12/2008 Sekine ............................ 399/51

FOREIGN PATENT DOCUMENTS

| JP | 1-165212 | 6/1989 |
| JP | 2002-166592 | 6/2002 |
| JP | 2005-288773 | 10/2005 |

* cited by examiner

*Primary Examiner* — Hai C Pham
(74) *Attorney, Agent, or Firm* — Cantor Colburn LLP (57) ABSTRACT

An image forming apparatus which performs an exposure of a plurality of line images concurrently, by scanning an image carrier with a plurality of light beams in a main scanning direction and simultaneously drives the image carrier in a sub scanning direction, the image forming apparatus having: a plurality of light sources which are driven to emit the plurality of light beams corresponding to image data; a polygon mirror configured to deflect the plurality of light beams emitted from the plurality of light sources in a main scanning direction; and a control section which determines an image formation speed and switches, based on the determined image formation speed, a control between a control of changing a number of light sources used for light emission drive and a control of changing a number of polygon mirror use-surfaces used for a scanning with the light beams in the main scanning direction.

10 Claims, 9 Drawing Sheets

| NUMBER OF USE-LIGHT SOURCES | POLYGON USE-SURFACES | EXPOSUE BY LIGHT SOURCES X POLYGON USE-SURAFACES | IMAGE FORMATION VELOCITY BASED ON COMBINATION |
|---|---|---|---|
| 4/4 | 6/6 | (a) | 24/24 |
| | 3/6 | (b) | 12/24 |
| 3/4 | 6/6 | (c) | 18/24 |
| | 3/6 | (d) | 9/24 |
| 1/2 | 6/6 | (e) | (12/24) |
| | 3/6 | (f) | 6/24 |
| 1/4 | 6/6 | (g) | (6/24) |
| | 3/6 | (h) | 3/24 |

FIG. 7 (a) H_Sync
FIG. 7 (b) H_VALID  FIRST SCAN   SECOND SCAN   THIRD SCAN
FIG. 7 (c) LD_1 
FIG. 7 (d) LD_2 
FIG. 7 (e) LD_3 
FIG. 7 (f) LD_4

FIG. 8 (a) H_Sync
FIG. 8 (b) H_VALID  FIRST SCAN   SECOND SCAN   THIRD SCAN
FIG. 8 (c) LD_1 
FIG. 8 (d) LD_2 
FIG. 8 (e) LD_3 
FIG. 8 (f) LD_4

FIG. 9 (a) H_Sync
FIG. 9 (b) H_VALID  FIRST SCAN   SECOND SCAN   THIRD SCAN
FIG. 9 (c) LD_1 
FIG. 9 (d) LD_2 
FIG. 9 (e) LD_3 
FIG. 9 (f) LD_4

FIG. 12

IMAGE FORMING APPARATUS, CONTROL METHOD THEREOF AND PROGRAM THEREOF

CROSS-REFERENCE TO RELATED APPLICATION

The present application is based on Japanese Patent Application No. 2007-186742 filed with Japan Patent Office on Jul. 18, 2007, entire content of which is hereby incorporated by reference.

TECHNICAL FIELD

The present invention relates to an image forming apparatus and an image forming apparatus control program for copying machines and printers, particularly relates to a multi-beam type image forming apparatus and a control program having a function for writing an image of a plurality of lines onto a recording medium, such as a photoconductor, with one scan using laser beams from a plurality of light sources.

RELATED ART

An image forming apparatus is known, which performs image formation for one page by repeating the image formation in every line of a main scanning direction in a sub scanning direction, while performing image formation of one line of the main scanning direction according to image data as image forming apparatus.

As an example, in the image forming apparatus of an electrophotographing system, the laser beam modulated according to image data is scanned onto the main scanning direction of an image carrier, and the image is formed by the above-mentioned laser beam in parallel to this on the image carrier (photoconductive drum), which rotates to a sub scanning direction. In this case, the image forming apparatus is arranged to modulate a laser beam by image data on the basis of the clock signal (pixel clock) called a dot clock.

In addition, an image forming apparatus is known, which has light sources, such as a plurality of 2 or 3 or more laser diodes (LD) in order to perform image formation with high resolution at high speed, repeats the image formation in every a plurality lines in a main scanning direction according to image data in a sub scanning direction and performs image formation for 1 page by using the laser beams from these plurality of light sources. The image forming apparatus of such a multi-beam type is described, for example, in the following patent reference No. 1.

In addition, several kinds of multi-beam image forming apparatuses are described in the following patent references No. 1-3, for example. By the way, it is also possible to form an image onto transfer papers other than a usual regular paper.

However, in order to apply sufficient heat for a transfer paper in the case of thick paper sheet, it is necessary to pass the transfer paper sheet through a fixing section at a low speed. In this case, it is necessary to reduce the transportation speed of the transfer paper in a whole image forming apparatus.

As such low-speed image formation, when the rotational speed of a polygon mirror is changed, the load to a polygon motor will become heavy and will become a status, which is not desirable for using the image forming apparatus for a long period of time in a stable condition.

Then, the rotational speed of a polygon mirror is not changed but the number of beams to be used, namely, the technique of changing image formation speed to a low speed by reducing the number of the light sources to be used, exists in a multi-beam image formation.

In addition, the rotational speed of the polygon mirror is not changed but the technique of changing image formation speed to a low speed also exists in multi-beam image formation by thinning out the number of use planes of reflection to be used of the polygon mirror.

[Patent reference No. 1] Unexamined Japanese Patent Application Publication No. 11-65212 (FIG. 1 on page 1)
[Patent reference No. 2] Unexamined Japanese Patent Application Publication No. 2002-166592 (FIG. 1 on page 1)
[Patent reference No. 3] Unexamined Japanese Patent Application Publication No. 2005-288773 (FIG. 1 on page 1)

In the patent references No. 1-3 above, the technology with respect to a general multi-beam image forming apparatus is described. In cases where this kind thinning of the number of beams and the thinning of the number of polygon mirror use-surfaces are used, low speed-ization according to the number of light sources or the number of polygon mirror surfaces is attained.

In the multi-beam image forming apparatus, which uses four light sources, for example, $3/4$ speed, $2/4$ speed and $1/4$ speed become possible by changing the number of light sources to be used. In addition, about the deviation of the deterioration between a plurality of light sources in such a case, it was not considered at all.

In addition, in the image forming apparatus using the polygon mirror having six surfaces, $3/6$ speed, $2/6$ speed and $1/6$ speed become possible with the number of polygon mirror surfaces to be used. In addition, in the image forming apparatus using the polygon mirror having eight surfaces, $4/8$ speed, $2/8$ speed, and $1/8$ speed become possible with the number of polygon mirror surfaces to be used. In this case, since it is necessary to repeat a use-surface periodically, in the case of not more than $1/2$ speed, only the limited number of speed can be selected correspond to the limited number of surfaces to be used.

In addition, in the above patent reference No. 2, although the technology with respect to beam switching is described, a control program becomes complicated and newly generates the problem that program capacity (memory capacity) increases.

In addition, in the above patent reference No. 3, in cases where the mode, which does not use some light sources, exists, the light source used for every page is changed, and the technology, which uniformly deteriorates the light sources, is described. However, while the control, which changes a light source for every page, is needed, the new problem that the image quality changes in every page arises by the change of the light source, may be generated. In addition, in the case of color image formation, change of the above image quality may constitute color gap, and may become a big problem.

The present invention is made in order to solve the above-mentioned problems. An object of the present invention is to realize an image forming apparatus and an image forming apparatus control program, which can widely change the image formation speed in a stable state without deteriorating the image quality.

In addition, the present invention is made in order to solve the above-mentioned problems. Another object of the present invention is to realize an image forming apparatus and an image forming apparatus control program, which is capable of widely changing the image formation speed in a stable condition without deteriorating the image quality while bringing deterioration of each light source at the time of using a plurality of laser beams for exposure close to the most uniform state condition as much as possible.

SUMMARY (1) According to a first aspect of the present invention, there is provided an image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming apparatus including: a plurality of light sources to generate the plurality of light beams, which are driven to emit the plurality of light beams corresponding to image data; a polygon mirror configured to deflect the plurality of light beams emitted from the plurality of light sources in a main scanning direction; and a control section which determines an image formation speed and switches, based on the determined image formation speed, a control between a control of changing a number of light sources used for light emission drive and a control of changing a number of polygon mirror use-surfaces used for a scanning with the light beams in the main scanning direction.

(2) According to a second aspect of the present invention, there is provided an image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming apparatus including: a plurality of light sources to generate the plurality of light beams, which are driven to emit the plurality of light beams corresponding to image data; a polygon mirror configured to deflect the plurality of light beams emitted from the plurality of light sources in a main scanning direction; and a control section which determines an image formation speed and changes a combination of a number of light sources to be used for a drive to emit the plurality of light beams and a number of polygon mirror use-surfaces used for a scanning with the light beams in the main scanning direction, based on the determined image formation speed.

(3) According to a third aspect of the present invention, there is provided an image forming method for forming an image with a image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming method comprising the steps of: determining an image formation speed that corresponds to a driving speed of the image carrier to be driven in the sub scanning direction; determining, based on the determined image formation speed, which to change: a number of light sources used for light emission drive, or a number of polygon mirror use-surfaces used for a scanning with the light beams in the main scanning direction; changing the number of light sources used for light emission drive or the number of polygon mirror use-surfaces based on the determined number to be changed; and changing the driving speed of the image carrier in the sub scanning direction to the driving speed of the image carrier to be driven in the sub scanning direction.

(4) According to a fourth aspect of the present invention, there is provided an image forming method for forming an image with a image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming method comprising the steps of: determining an image formation speed that corresponds to a driving speed of the image carrier to be driven in the sub scanning direction; changing a combination of a number of light sources to be used for a drive to emit the plurality of light beams and a number of polygon mirror use-surfaces used for a scanning with the light beams in the main scanning direction, based on the determined image formation speed; and changing the driving speed of the image carrier in the sub scanning direction to the driving speed of the image carrier to be driven.

(5) According to a fifth aspect of the present invention, there is provided a computer-readable medium having computer-executable instructions for performing an image forming method of forming an image with a image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming method comprising the steps of: determining an image formation speed that corresponds to a driving speed of the image carrier to be driven in the sub scanning direction; determining, based on the determined image formation speed, which to change: a number of light sources used for light emission drive, or a number of polygon mirror use-surfaces used for a scanning with the light beams in the main scanning direction; changing the number of light sources used for light emission drive or the number of polygon mirror use-surfaces based on the determined number to be changed; and changing the driving speed of the image carrier in the sub scanning direction to the driving speed of the image carrier to be driven in the sub scanning direction.

(6) According to a sixth aspect of the present invention, there is provided a computer-readable medium having computer-executable instructions for performing an image forming method of forming an image with a image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming method comprising the steps of: determining an image formation speed that corresponds to a driving speed of the image carrier to be driven in the sub scanning direction; changing a combination of a number of light sources to be used for a drive to emit the plurality of light beams and a number of polygon mirror use-surfaces used for a scanning with the light beams in the main scanning direction, based on the determined image formation speed; and changing the driving speed of the image carrier in the sub scanning direction to the driving speed of the image carrier to be driven.

DESCRIPTION OF THE PREFERRED EMBODIMENTS

Hereafter, a preferable embodiment (embodiment) for carrying out the present invention will be explained in detail with reference to drawings. The image forming apparatus to which this embodiment is applied is a multi-beam type image forming apparatus, which scans a plurality of laser beams from a plurality of light sources to the main scanning direction of an image carrier, and simultaneously performs exposure for a plurality of lines.

Figure 1:
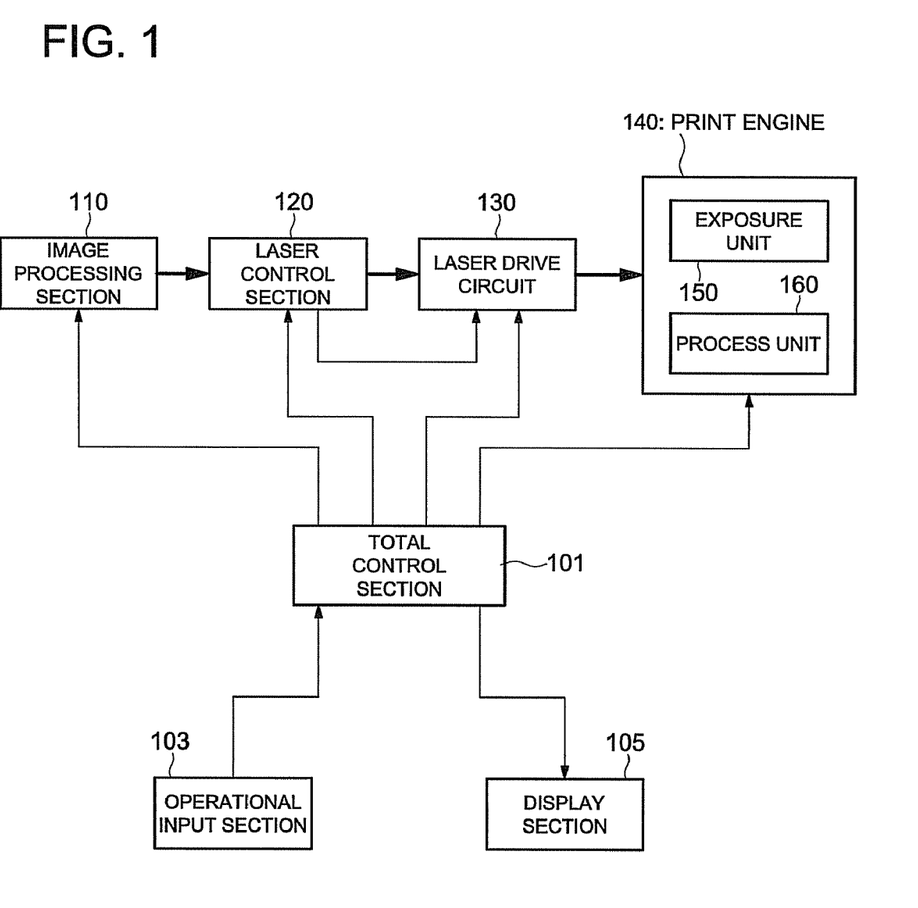
FIG. 1 is a block diagram illustrating the structure of an image forming apparatus of an embodiment of the present invention.

Hereafter, an electrical configuration of the first embodiment of a multi-beam type image forming apparatus 100 of this embodiment will be explained in detail based on FIG. 1.

In addition, with this embodiment, the fundamental constituent elements of the image forming apparatus 100 using a plurality of laser beams, which are used for exposure without degrading image quality will be explained by focusing on the constituent elements. Therefore, the constituent elements, which are well known and general as image forming apparatus, will be omitted here.

First Embodiment

101 denotes a total control section, which configures the control section configured by a CPU, in order to control each part of the image forming apparatus 100. 103 denotes an operational section for operators to conduct input operations and to input various commands. 105 denotes a display section, which display variety of information. 110 denotes an image processing section, which executes predetermined image processing according to image data. 120 denotes a laser control section, which controls luminescence of a laser according to image data or predetermined command data. 130 denotes a laser drive circuit, which drives a light source based on control of the laser control section 120. 140 denotes a print engine, which performs image formation by exposure. The print engine 140 is equipped with an exposure unit 150, which performs scan with a plurality of laser beams, and a process unit 160, and configured therefrom.

Figure 2:
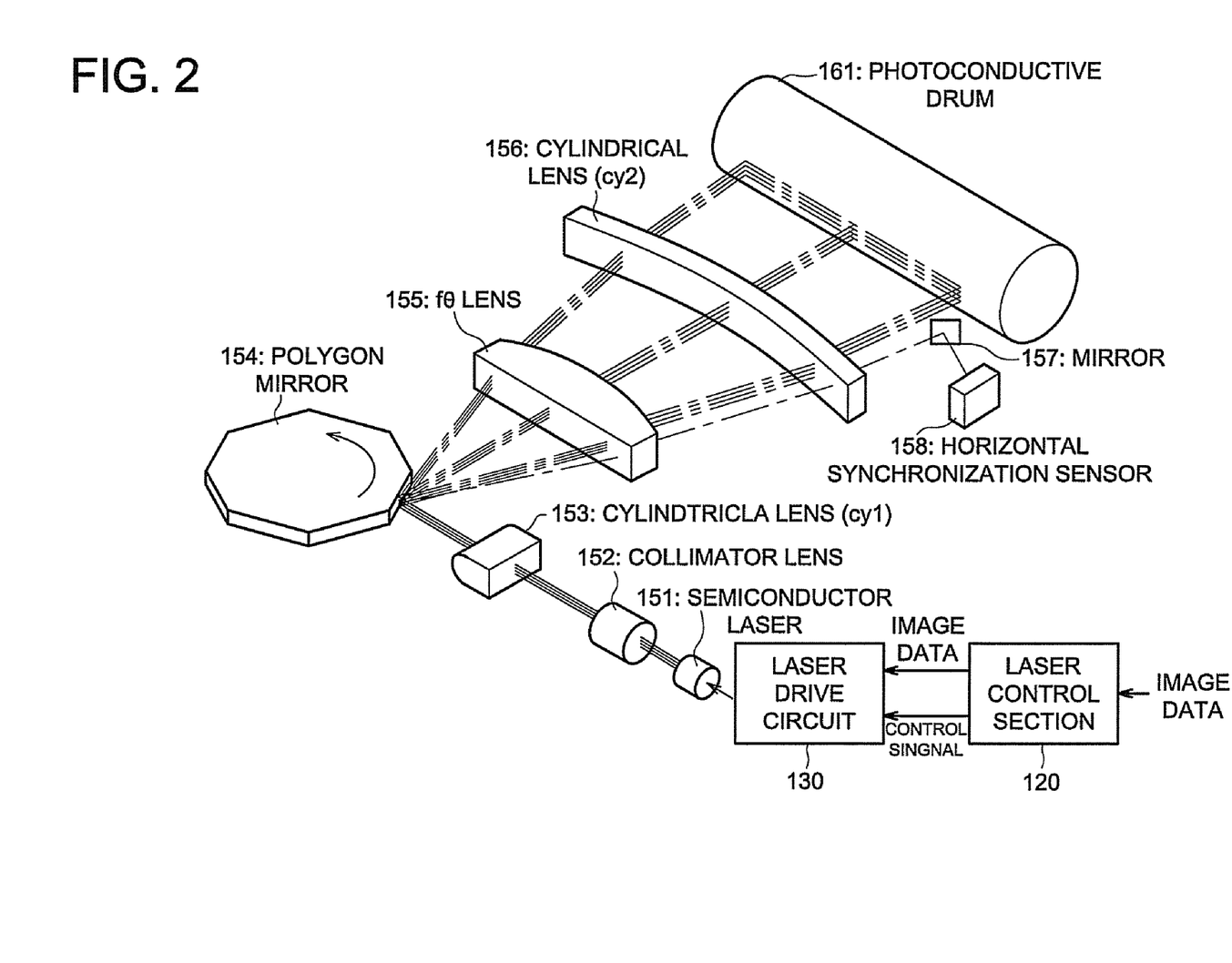
FIG. 2 is a diagram illustrating the structure of an image forming apparatus of the first embodiment of the present invention.

FIG. 2 is a diagram schematically illustrating circumference of the laser control section 120, the laser drive circuit 130 and the exposure unit 150 as a perspective diagram. In addition, the portion illustrated as a perspective diagram in this FIG. 2 is illustrated in FIG. 3 in the state where it is considered as a plan view.

Figure 3:
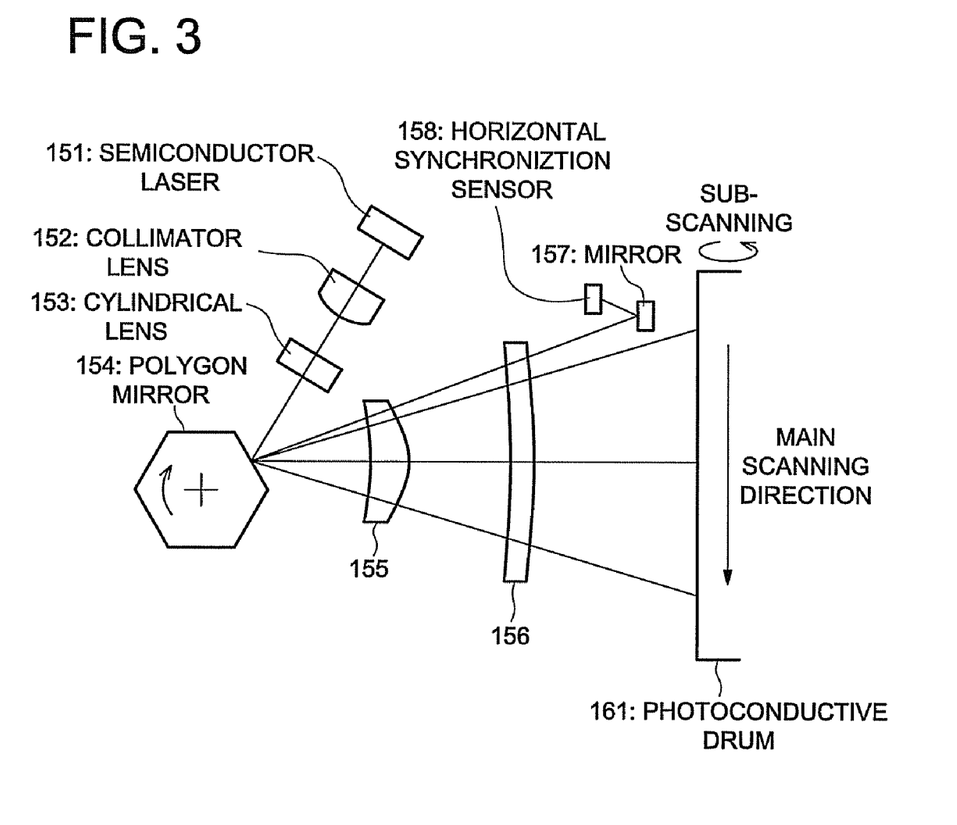
FIG. 3 is a diagram illustrating the structure of an image forming apparatus of the first embodiment of the present invention.

In these FIGS. 2 and 3, the exposure unit 150 includes a semiconductor laser 151 as a plurality of light sources to generate a plurality of laser beams, a collimator lens 152, which optically carries out various compensations for a laser beam, a cylindrical lens 153, a polygon mirror 154, which scans a laser beam to the main scanning direction, a Fθ lens 155, which compensates a scanning angle, a cylindrical lens 156, which performs optical compensation, a mirror 157 for detecting a horizontal synchronizing signal, and a horizontal synchronization sensor 158 for detecting horizontal synchronizing signal.

Here, the portion illustrated as a semiconductor laser 151 in FIG. 2 may be a structure configured so as to include an optical section for configuring a plurality of laser beams formed by a plurality of semiconductor laser, in fact, or may be a beam laser array, which has been structured into one body. By the example described later, four light sources (LD_1-LD_4) shall be provided as a semiconductor laser 151.

And a plurality of laser beams to be scanned as mentioned above is scanned on the photoconductive drum 161 as an image carrier, and the latent image according to a laser beam is formed on the surface of the photoconductive drum 161 considering the rotation of the photoconductive drum 161 as a scan in the sub scanning direction. In addition, in the case of color-image-formation apparatus, the exposure unit 150 illustrated here is arranged based on the number of colors.

In the above configuration, the image processing section 110 denotes an image processing section, which performs various kinds of image processing required for image formation, and with regard to this embodiment, in order for a plurality of light sources to perform simultaneous exposure, it has a function, which outputs the image data for each line in parallel corresponding to a plurality of light sources.

Hereafter, the first operation (the first embodiment) of the image forming apparatus 100 of this embodiment will be explained with reference to the flow chart of FIG. 4. Here, as illustrated in FIG. 2, the image forming apparatus, which scans four lights (laser beams) from four light sources to the main scanning direction by a polygon mirror having six surfaces, is used for an example.

Figure 4:
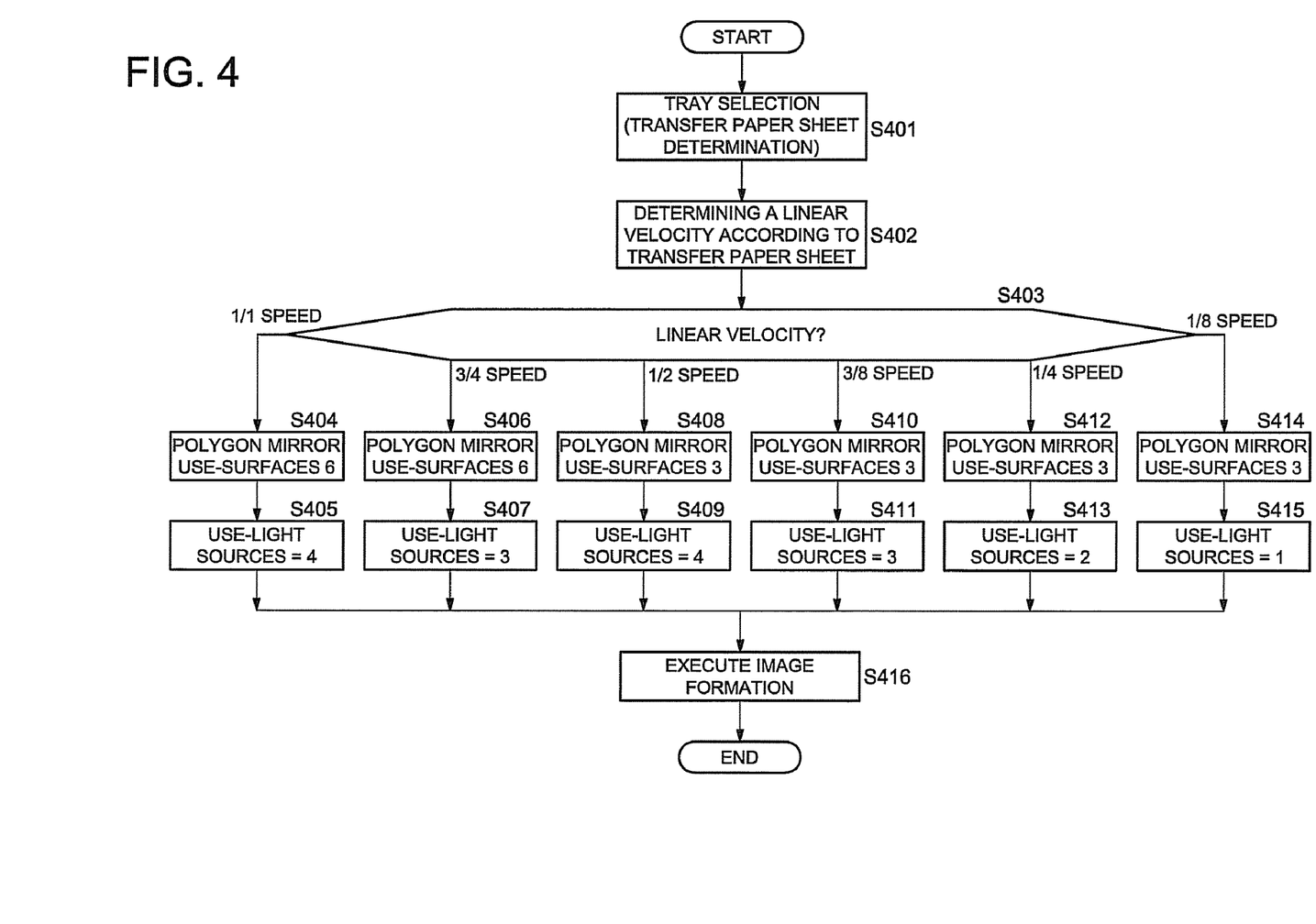
FIG. 4 is a flow chart explaining the operating state of an image forming apparatus of the first embodiment of the present invention.

When the operational unit 103 has received the directions about the image formation from an operator, the total control section 101, which received the data according to the directions by the operational section 103, will choose the tray in which the transfer paper onto which image formation is performed was accommodated (STEP S401 in FIG. 4). And, the total control section 101 determines the image formation speed (linear velocity) for which it is suitable according to the kind of paper sheets and weight of a transfer paper sheet, to which image formation is performed (STEP S402 in FIG. 4). This image formation speed (linear velocity) is the velocity at which a transfer paper sheet is conveyed in the sub scanning direction in the case of image formation within the image forming apparatus 100, namely, a sub scanning direction transportation speed, and fixability changes according to the change of the quantity of heat received from a fixing roller within the fixing apparatus according to this velocity. That is, the image formation speed is reduced in order to secure fixability, in case when the thickness of a transfer paper is large.

In this image forming apparatus, four light sources and a polygon mirror having six surfaces are used, and it is assumed that the image formation speed is arranged to be able to be set at 1/1 speed, ¾ speed, ½ speed, ⅜ speed, ¼ speed and ⅛ speed with the combination of a number of use-light sources and the number of polygon mirror use-surfaces.

Figure 5:
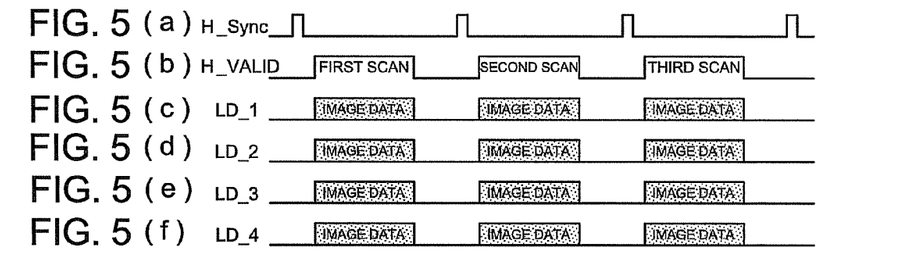
FIG. 5 is a time chart explaining the operating state of an image forming apparatus of the first embodiment of the present invention.
Figure 6:
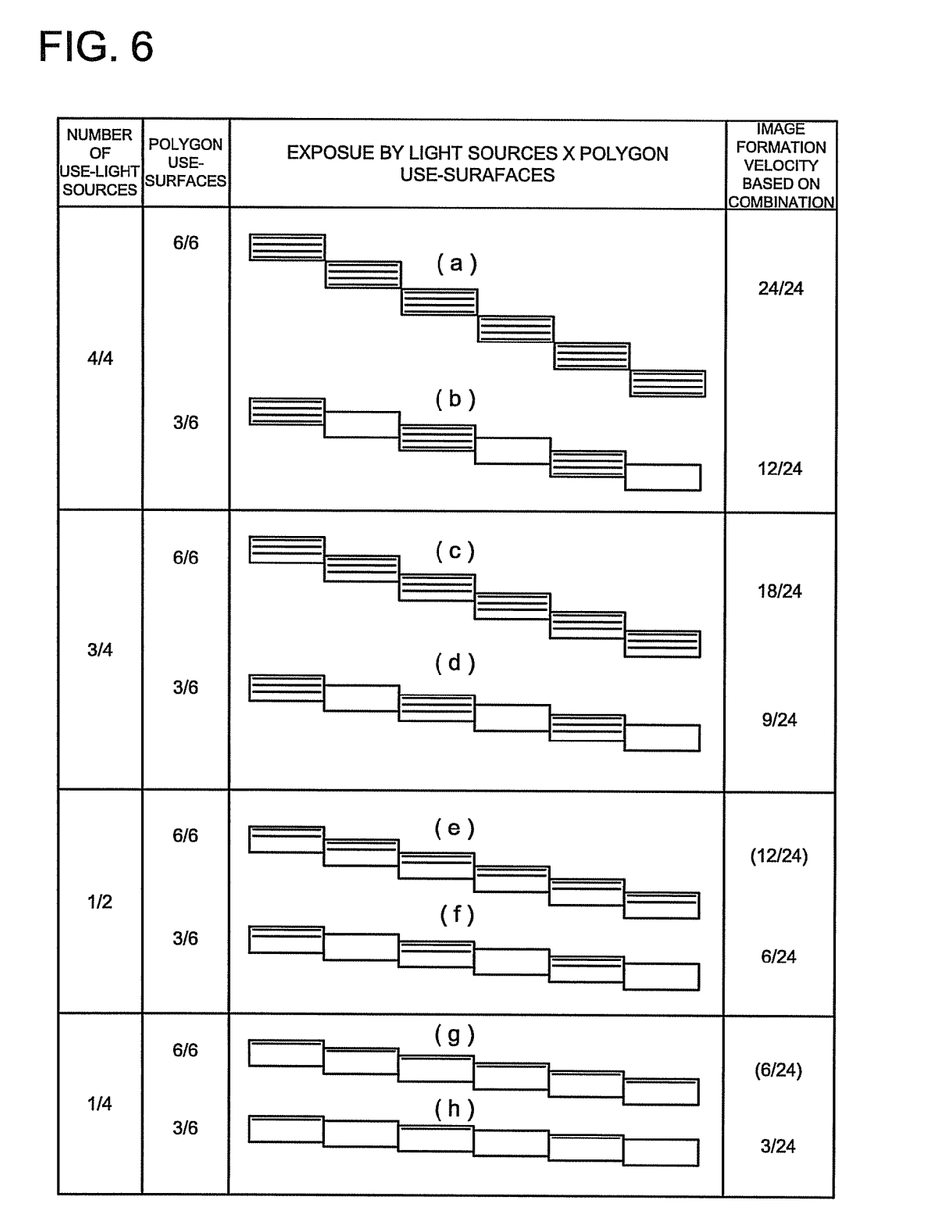
FIG. 6 is a time chart explaining the operating state of an image forming apparatus of the first embodiment of the present invention.

In cases where a regular paper sheet and a transfer paper sheet equivalent to this are chosen, the total control section 101 chooses image formation speed of 1/1 speed ("1/1 speed" in STEP S403 in FIG. 4). In this case, the total control section 101 sets the number of polygon mirror use-surfaces to six surfaces without thinning of the number of polygon mirror use-surfaces (STEP S404 in FIG. 4), and sets a number of use-light sources to 4 without thinning of the number of use-light sources (STEP S405 in FIG. 4). In this case, as illustrated in FIG. 5, each light source emits light according to image data in each scanning period. And image formation is executed, while a transfer paper sheet is conveyed at 1/1 speed (STEP S416 in FIG. 4). In addition, when this situation is illustrated schematically, it will become as shown in FIG. 6 (a). In FIG. 6, the exposure locus by luminescence and the main scanning of four light sources for every 1 main scanning period is described on the right-hand side. In this case, image formation is executed, while the laser control section 120 and the laser drive circuit 130 repeat exposure by 4 light sources according to the image data of four lines read from the image processing section 110 for every 1 main scanning period, and convey a transfer paper sheet at 1/1 speed under the control of the total control section 101.

Figure 7:
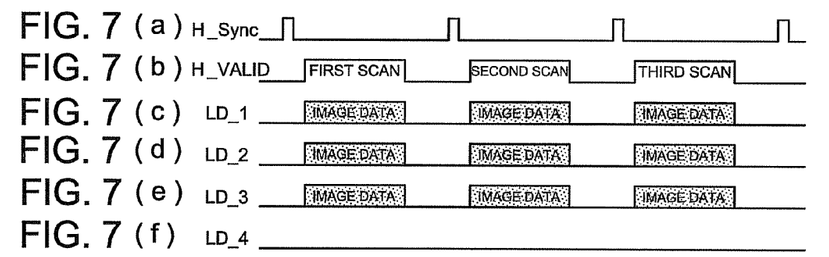
FIG. 7 is a time chart explaining the operating state of an image forming apparatus of the first embodiment of the present invention.

In cases where the transfer paper sheet, which is thicker than a regular paper sheet and needs to set the image formation speed at a lower speed, is chosen, the total control section 101 chooses image formation speed of ¾ speed ("¾ speed" in STEP S403 in FIG. 4). In this case, the total control section 101 sets the number of polygon mirror use-surfaces to 6 surfaces without thinning (STEP S406 in FIG. 4), and sets the number of use-light source to 3 with performing 1 (one) thinning (STEP S407 in FIG. 4). In this case, as illustrated in FIG. 7, three light sources emit light according to the image data in each main scanning period. And image formation is executed, while the transfer paper sheet is conveyed at ¾ speed (STEP S416 in FIG. 4). In addition, when this situation is schematically illustrated, it will become as shown in FIG. 6 (c). In this FIG. 6, the exposure locus by luminescence and the main scanning of three light sources for every 1 main scanning period is described on the right-hand side. In this case, image formation is executed, while the laser control section 120 and the laser drive circuit 130 repeat exposure by 3 light sources according to the image data for 3 lines read from the image processing section 110 for every 1 main scanning period, and convey the transfer paper sheet at ¾ speed under the control of the total control section 101.

Figure 8:
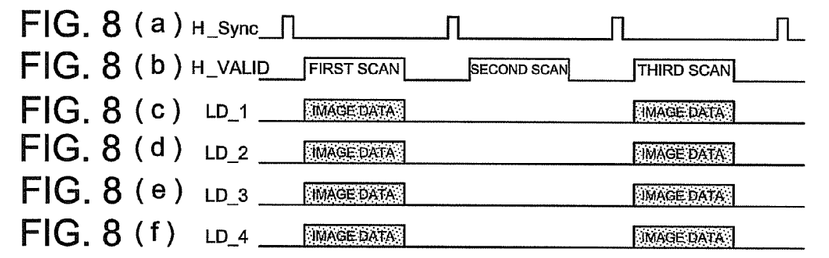
FIG. 8 is a time chart explaining the operating state of an image forming apparatus of the first embodiment of the present invention.

In cases where the transfer paper sheet, which is furthermore thick and needs to set the image formation speed at a low speed, is chosen, the total control section 101 chooses the image formation speed of ½ speed ("½ speed" in STEP S403 in FIG. 4). In this case, the total control section 101 sets the number of polygon mirror use-surfaces to 3 surfaces with thinning (STEP S408 in FIG. 4), and sets the number of use-light source to 4 without thinning (STEP S409 in FIG. 4). In this case, as illustrated in FIG. 8, 4 light sources emit light according to image data in every other main scanning period. And image formation is executed, while the transfer paper sheet is conveyed at ½ speed (STEP S416 in FIG. 4). In addition, when this situation is schematically illustrated, it will become as it is shown in FIG. 6(b). In this FIG. 6, the exposure locus by luminescence and the main scanning of three light sources of every other main scanning period is described on right-hand side. In this case, image formation is executed, while the laser control section 120 and the laser drive circuit 130 repeat exposure by 4 light sources according to the image data for 4 lines read from the image processing section 110 for every other main scanning period, and conveying the transfer paper sheet at ½ speed under the control of the total control section 101.

Figure 9:
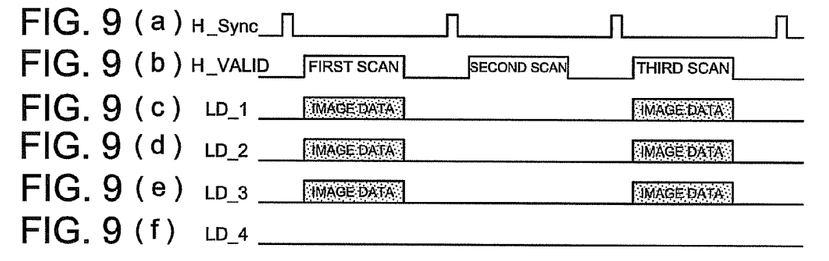
FIG. 9 is a time chart explaining the operating state of an image forming apparatus of the first embodiment of the present invention.

In cases where the transfer paper sheet, which is furthermore thick and needs to set image formation speed at a low speed, is chosen, the total control section 101 chooses the image formation speed of ⅜ speed ("⅜ speed" in STEP S403 in FIG. 4). In this case, the total control section 101 sets the number of polygon mirror use-surfaces to 3 surfaces with a thinning (STEP S410 in FIG. 4), and sets the number of use-light source to 3 with thinning (STEP S411 in FIG. 4). In this case, as illustrated in FIG. 9, 3 light sources emit lights according to image data in every other main scanning period. And image formation is executed, while a transfer paper sheet is conveyed at ⅜ speed (STEP S416 in FIG. 4). In addition, when this situation is schematically illustrated, it will become as shown in FIG. 6(d). In FIG. 6, luminescence of three light sources of every other main scanning period and the exposure locus of a main scanning are described on right-hand side. In this case, image formation is executed, while the laser control section 120 and the laser drive circuit 130 repeat exposure by 3 light sources according to the image data for 3 lines read from the image processing section 110 in every other main scanning period, and convey a transfer paper sheet at ⅜ speed under the control of the total control section 101.

Figure 10:
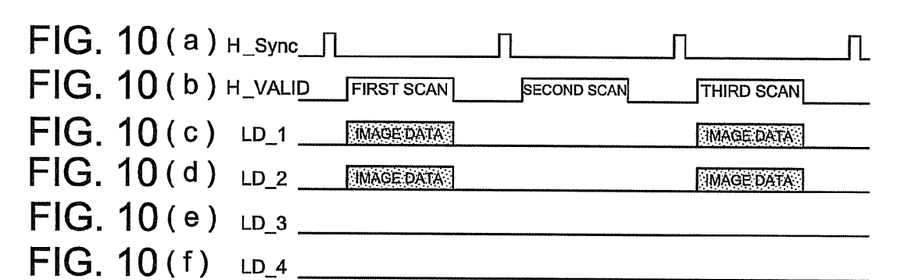
FIG. 10 is a time chart explaining the operating state of an image forming apparatus of the first embodiment of the present invention.

In cases where the transfer paper sheet, which is furthermore thick and needs to set image formation speed at a low speed, is chosen, the total control section 101 chooses image formation speed of ¼ speed ("¼ speed" in STEP S403 in FIG. 4). In this case, the total control section 101 sets the number of polygon mirror use-surfaces to 3 surfaces with thinning (STEP S412 in FIG. 4), and sets a number of use-light sources to 2 with thinning (STEP S413 in FIG. 4). In this case, as illustrated in FIG. 10, two light sources emit light according to image data in every other main scanning period. And image formation is executed, while a transfer paper sheet is conveyed at ¼ speed (STEP S416 in FIG. 4). In addition, when this situation is schematically illustrated, it will become as shown in FIG. 6(f). In FIG. 6, the exposure locus by luminescence and the main scanning of 2 light sources of every other main scanning period is described on the right-hand side. In this case, image formation is executed, while the laser control section 120 and the laser drive circuit 130 repeat exposure by 2 light sources according to the image data for two lines read from the image processing section 110 in every other main scanning period, and convey a transfer paper sheet at ¼ speed under the control of the total control section 101.

Figure 11:
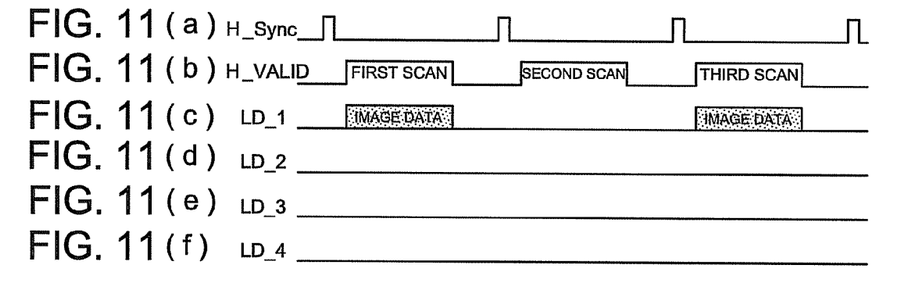
FIG. 11 is a time chart explaining the operating state of an image forming apparatus of the first embodiment of the present invention.

In cases where the transfer paper sheet, which is furthermore thick and needs to set image formation speed at a low speed, is chosen, the total control section 101 chooses image formation speed of ⅛ speed ("⅛ speed" in STEP S403 in FIG. 4). In this case, the total control section 101 sets the number of polygon mirror use-surfaces to 3 surfaces with thinning (STEP S414 in FIG. 4), and sets a number of use-light sources to 1 with thinning (STEP S415 in FIG. 4). In this case, as illustrated in FIG. 11, 1 light source emits light according to image data in every other main scanning period. And image formation is executed, while a transfer paper sheet is conveyed at ⅛ speed (STEP S416 in FIG. 4). In addition, when this situation is illustrated schematically, it will become as it is shown in FIG. 6(h). In this FIG. 6, the exposure locus by luminescence and the main scanning of one light source of every other main scanning period is described on right-hand side. In this case, image formation is executed, while the laser control section 120 and the laser drive circuit 130 repeat exposure by 1 light source according to the image data for one line read from the image processing section 110 in every other main scanning period, and conveying a transfer paper sheet at ⅛ speed by control of the total control section 101.

Here, with respect to the combination of the number of light sources and the number of polygon mirror use-surfaces from which image formation speed is set to one half (=12/24) in the diagram of above FIG. 6, there exist the combination (FIG. 6 (*b*)) of 4 light sources (without thinning) and 3 polygon-mirror use-surfaces (those with thinning), and the combination (FIG. 6(*e*)) of 2 light sources (those with thinning) and 6 polygon-mirror use-surface (without thinning).

As described above, in cases where a plurality of changes and combinations exist to the same image formation speed (sub scanning direction drive velocity), priority is given to the change of the number of polygon mirror use-surfaces. That is, priority is given to the combination of 4 light sources without thinning), and 3 polygon-mirror use-surface (those with a thinning) in this case.

As a result, the change of the number of light sources is suppressed, and change becomes widely possible in the sub scanning direction drive velocity, namely, image formation speed, while bringing deterioration of each light source at the time of using a plurality of laser beams for exposure close into the most uniform state in the stable state as much as possible.

In addition, with regard to the combination of the number of light sources and the number of polygon mirror use-surfaces from which image formation speed is set to one fourth (=6/24) in the diagram of above FIG. 6, there exist the combination (FIG. 6(*f*)) of 2 light sources (without thinning) and 3 polygon-mirror use-surfaces (those with a thinning), and the combination (FIG. 6(*g*)) of 1 light source (those with a thinning) and 6 polygon-mirror use-surface (without thinning).

Thus, in cases where a plurality of changes or combinations exist to the same image formation speed (sub scanning direction drive velocity), and in case when combining the number change of polygon mirror use-surfaces and the number change of light sources, the priority is given to the combination, in which the number of light sources does not become odd number. That is, priority is given to the combination of 2 light sources (even number) and 3 polygon-mirror use-surface (those with thinning), rather than the combination of 1 light source (odd number) and 6 polygon-mirror use-surface (without thinning) in this case.

As a result, the control of read-out of image data becomes easy and the change becomes widely possible in sub scanning direction drive velocity, namely, image formation speed, while bringing deterioration of each light source at the time of using a plurality of laser beams for exposure close to the most uniform state as much as possible.

And since it is not necessary to alter the number of rotations of a polygon mirror in the case of the first embodiment configuration, the image formation can be achieved in the stable state without degrading image quality. In addition, since change of the number of light sources and change of the number of polygon mirror use-surfaces are used by combining both of them, image formation speed can be widely altered.

Hereafter, the second operation (the second embodiment) of the image forming apparatus 100 of this embodiment will be described with reference to the flow chart of FIG. 12. Here, as illustrated in FIG. 2, the image forming apparatus, which scans four lights (laser beam) from four light sources to the main scanning direction by a polygon mirror having six surfaces is used for an example.

Figure 12:
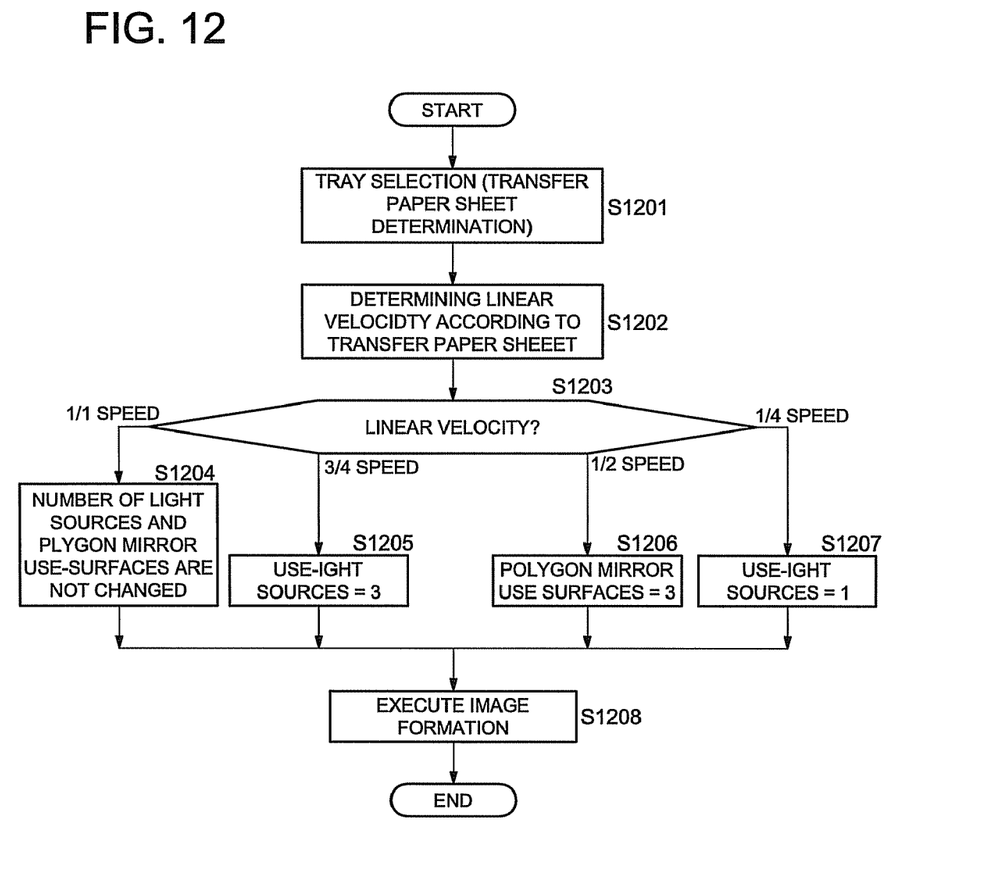
FIG. 12 is a time chart explaining the operating state of an image forming apparatus of the second embodiment of the present invention.

When the operational section 103 has received the directions about the image formation from an operator, the total control section 101 which received the data according to directions from the operational section 103 will choose the tray in which the transfer paper sheet to which image formation is performed, is accommodated (STEP S1201 in FIG. 12). And the total control section 101 determines the image formation speed (linear velocity) for which it is suitable according to the kind of paper sheets and the weight of the transfer paper sheet to which image formation performed (STEP S1202 in FIG. 12). This image formation speed (linear velocity) is the velocity at which a transfer paper sheet is conveyed by the sub scanning direction in the case of image formation within the image forming apparatus 100, namely, sub scanning direction transportation speed, and fixability changes according to the quantity of heat received from a fixing roller within fixing apparatus according to this velocity changing. That is, the image formation speed is reduced in order to secure fixability, in case when the thickness of a transfer paper is large.

In this image forming apparatus, four light sources and a polygon mirror having six surfaces are used, and it is assumed that image formation speed is arranged to be able to set at 1/1 speed, ¾ speed, ½ speed, and ¼ speed by switching the change of a number of use-light sources and the change of the number of polygon mirror use-surfaces.

In cases where a regular paper sheet or a transfer paper sheet equivalent to this is chosen, the total control section 101 chooses image formation speed of 1/1 speed ("1/1 speed" STEP S1203 in FIG. 12). In this case, the total control section 101 sets the number of polygon mirror use-surfaces to 6 surfaces without thinning, and sets a number of use-light sources to 4 without thinning (STEP S1204 in FIG. 12). In this case, as illustrated in FIG. 5, each light source emits light according to image data in each main scanning period. And image formation is executed, while a transfer paper sheet is conveyed at 1/1 speed (STEP S1208 in FIG. 12). In addition, when this situation is illustrated schematically, it will become as it is shown in FIG. 6(*a*). In FIG. 6, the exposure locus by luminescence and the main scanning of four light sources for every 1 main scanning period is described on the right-hand side. In this case, image formation is executed, while the laser control section 120 and the laser drive circuit 130 repeat exposure by 4 light sources according to the image data for four lines read from the image processing section 110 for every 1 main scanning period, and conveying a transfer paper sheet at 1/1 speed under the control of the total control section 101.

In cases where the transfer paper sheet, which is thick and needs to set image formation speed at a low speed from a regular paper sheet, is chosen, the total control section 101 chooses image formation speed at ¾ speed ("¾ speed" STEP S1203 in FIG. 12). In this case, the total control section 101 sets the number of polygon mirror use-surfaces to 6 surfaces without a thinning, and sets the number of use-light source to 3 with one thinning (STEP S1205 in FIG. 12). In this case, as illustrated in FIG. 7, three light sources emit lights according to image data in each main scanning period. And image formation is executed, while a transfer paper sheet is conveyed by ¾ speed (STEP S1208 in FIG. 12). Here, when this situation is illustrated schematically, it will become as it is shown in FIG. 6(*c*). In this FIG. 6, the exposure locus by luminescence and the main scanning of 3 light sources for every 1 main scanning period is described on right-hand side. In this case, image formation is executed, while the laser control section 120 and the laser drive circuit 130 repeat exposure by 3 light sources according to the image data for three lines read from the image processing section 110 for every 1 main scanning period, and convey a transfer paper sheet at ¾ speed under the control of the total control section 101.

Furthermore, in cases where the transfer paper sheet, which is thick and needs to set image formation speed at a low speed, is chosen, the total control section 101 chooses image formation speed of ½ speed ("½ speed" in STEP S1203 in FIG. 12). In this case, the total control section 101 sets the number of polygon mirror use-surfaces to 3 surfaces with thinning, and sets a number of use-light source to 4 without thinning (STEP S1206 in FIG. 12). In this case, as illustrated in FIG. 8, four light sources emit light according to image data in every 1 main scanning period. And image formation is executed, while a transfer paper sheet is conveyed at ½ speed (STEP S1208 in FIG. 12). Here, when this situation is illustrated schematically, it will become as it is shown in FIG. 6 (*b*). In FIG. 6, the exposure locus by luminescence and the main scanning of 3 light sources of every other main scanning period is described on right-hand side. In this case, image formation is executed, while the laser control section 120 and the laser drive circuit 130 repeat exposure by 4 light sources according to the image data for four lines read from the image processing section 110 in every other main scanning period, and conveying a transfer paper sheet at ½ speed under the control of the total control section 101.

Furthermore, in cases where the transfer paper sheet, which is thick and needs to set image formation speed at a low speed, is chosen, the total control section 101 chooses image formation speed at ¼ speed ("¼ speed" in STEP S1203 in FIG. 12). In this case, the total control section 101 sets the number of polygon mirror use-surfaces to 6 surfaces without a thinning, and sets a number of use-light source to 1 with 3 thinning (STEP S1207 in FIG. 12). In this case, 1 light source emits light according to image data in each main scanning period. And image formation is executed, while a transfer paper sheet is conveyed at ¼ speed (STEP S1208 in FIG. 12). Here, when this situation is illustrated schematically, it will become as it is shown in FIG. 6(*g*). In FIG. 6, the exposure locus by luminescence and the main scanning of 1 light source for in every 1 main scanning period is described on right-hand side. In this case, image formation is executed, while the laser control section 120 and the laser drive circuit 130 repeat exposure by 1 light source according to the image data for one line read from the image processing section 110 for in every 1 main scanning period, and convey a transfer paper sheet at ¼ speed under the control of the total control section 101.

In the case of the above second embodiment, it is not necessary to alter the number of rotations of a polygon mirror. Therefore, image formation can be performed in the stable state without degrading image quality. In addition, since it is not only change of the number of light sources and change of the number of polygon mirror use-surfaces, the image formation speed can be altered widely.

In the case of the above second embodiment, by alternatively switching the change of a number of use-light source and the change of the number of polygon mirror use-surfaces so that either one may be chosen, image formation speed is changed to 1/1 speed, ¾ speed, ½ speed and ¼ speed, and it has the advantage that control becomes simple.

Other Embodiment

In the explanation of the above embodiments, the total control section 101 is supposed to determine the image formation speed according to weight or the kind of paper sheets. In this case, a table (not shown), which memorized suitable image formation speed according to weight or the kind of paper sheets, should just exist. In addition, the structure by which an operator can specify image formation speed from the operational input section 103 may be allowed. For example, in cases where a new kind of transfer paper sheet, which has not been saved on the above-mentioned table, is used, an operator should just specify image formation speed.

In addition, although the above explanation was described by using the example, which executes image formation by using four light sources and a polygon mirror having six surfaces, the total number of light sources and the number of surfaces of the polygon mirror here are not limited to the examples indicated, but various kinds of modification may be possible. In addition, in cases where the number of rotations of a polygon motor can be stably altered, it is also possible to use the combination of the number of rotations change of the polygon motor and the control of the described light source.

In addition, what is necessary is not to use all the image formation speed that becomes usable with the above change or combination, but just may select and use required the image formation speed out of the image formation speed, which can be used.

In addition, although the above embodiments have been explained by using the image forming apparatus of an electrophotographying system using laser beams, it is not limited to this. For example, it is possible to apply each embodiment of the present invention to various kinds of image forming apparatus, such as a laser imager, which conducts exposure on printing paper sheet using a laser beam, and it is possible to obtain a good result. In addition, although it is a case where other light sources other than a semiconductor laser (LD) are used as a light source, it is possible to apply this invention to the case.

As mentioned above, according to each embodiment of the present invention, the following effects are acquired as explained.

(1) In an image forming apparatus, which scans a plurality of light beams from a plurality of light sources in a main scanning direction of an image carrier and simultaneously performs exposure of a plurality of lines by driving the image carrier in a sub scanning direction, which is perpendicular to the main scanning direction of the image carrier, the control section switches the change of a number of light sources used for light emission drive and the change of a number of polygon mirror use-surfaces used for the main scanning direction scan of the light beams, and performs control, which changes a sub scanning direction drive velocity of the image carrier according to this change. In this case, since it is not necessary to alter the number of rotations of a polygon mirror, a stable state is realizable without degrading image quality. Further, since it is not only change of the number of light sources and change of the number of polygon mirror use-surfaces, it becomes possible to widely alter the sub scanning direction drive velocity, namely, image formation speed.

(2) In an image forming apparatus, which scans a plurality of light beams from a plurality of light sources in a main scanning direction of an image carrier and simultaneously performs exposure of a plurality of lines by driving the image carrier in a sub scanning direction, which is perpendicular to the main scanning direction of the image carrier, the control section performs control, which changes the combination of a number of light sources, which are used for a light emission drive, and a number of use-surfaces of the polygon mirror used for main scanning direction scan of the light beams, and alters a sub scanning direction drive velocity of the image carrier according to the combination. In this case, since it is not necessary to alter the number of rotations of a polygon mirror, a stable state can be realized without degrading image quality. Further, since the combination of change of the number of light sources, and the change of the number of polygon mirror use-surfaces is used, a sub scanning direction drive velocity, namely, an image formation speed, can be widely altered.

(3) In the above in (1)-(2), in the switch of the change of the number of light sources and the change of the number of polygon mirror or the combination thereof, in cases where a plurality of changes or combinations exists to the same sub scanning direction drive velocity use-surfaces or combination, priority is given to the change of the number of polygon mirror use-surfaces. As a result, change of the number of light sources is suppressed, and change of the sub scanning direction drive velocity, namely, image formation speed can be widely changed in a stable state while bringing deterioration of each light source at the time of using a plurality of laser beams for exposure close to the most uniform possible state.

(4) In the above (1)-(3), in cases where the combining the number change of polygon mirror use-surfaces and the number change of light sources, the priority is given to the combination in which the number of light sources does not become an odd number. As a result, the control of read-out of image data becomes easy, and at the time, the sub scanning direction drive velocity, namely, the change of image formation speed becomes widely possible in a stable state while bringing deterioration of each light source when using a plurality of laser beams for exposure close to the most uniform possible state.

(5) In an image forming apparatus, which scans a plurality of light beams from a plurality of light sources in a main scanning direction of an image carrier and simultaneously performs exposure of a plurality of lines by driving the image carrier in a sub scanning direction, which is perpendicular to the main scanning direction of the image carrier, control is performed in which the change of a number of light sources used for a light emission drive and the change of a number of polygon mirror use-surfaces used for the main scanning direction scan of the light beams are switched, and a sub scanning direction drive velocity of the image carrier is changed according to the change. In this case, since it is not necessary to alter the number of rotations of a polygon mirror, a stable state can be realized without degrading image quality. Further, it is not only the change of the number of light sources and change of the number of polygon mirror use-surfaces, the sub scanning direction drive velocity, namely, image formation speed, can be widely altered.

(6) In an image forming apparatus, which scans a plurality of light beams from a plurality of light sources in a main scanning direction of an image carrier and simultaneously performs exposure of a plurality of lines by driving the image carrier in a sub scanning direction, which is perpendicular to the main scanning direction of the image carrier, the combination of the number of polygon mirror use-surfaces used for the main scanning direction scan of the number of light sources and the number of light sources, which are used for a light emission drive, is changed, and the control, which alters the sub scanning direction drive velocity of the above-mentioned image carrier according to this combination, is performed. In this case, since it is not necessary to alter the number of rotations of the polygon mirror, it is possible to realize the stable state without degrading image quality and to use the combination of the change of the number of light sources and the change of the number of polygon mirror use-surfaces. Thus, the sub scanning direction drive velocity, namely, image formation speed, can be widely altered.

What is claimed is:

1. An image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming apparatus comprising:
a plurality of light sources to generate the plurality of light beams, which are driven to emit the plurality of light beams corresponding to image data;
a polygon mirror configured to deflect the plurality of light beams emitted from the plurality of light sources in a main scanning direction; and
a control section which determines an image formation speed and changes a combination of a number of light sources to be used for a drive to emit the plurality of light beams and a number of polygon mirror use-surfaces used for a scanning with the light beams in the main scanning direction, based on the determined image formation speed,
wherein the control section controls so that, in cases where a plurality of combinations of light sources to be used for a drive to emit the plurality of light beams and a number of polygon mirror use-surfaces used for a scanning with the light beams in the main scanning direction exist to the same image formation speed, priority is given to the change of the number of polygon mirror use-surfaces.

2. An image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming apparatus comprising:
a plurality of light sources to generate the plurality of light beams, which are driven to emit the plurality of light beams corresponding to image data;
a polygon mirror configured to deflect the plurality of light beams emitted from the plurality of light sources in a main scanning direction; and
a control section which determines an image formation speed and changes a combination of a number of light sources to be used for a drive to emit the plurality of light beams and a number of polygon mirror use-surfaces used for a scanning with the light beams in the main scanning direction, based on the determined image formation speed;
wherein the control section controls so that, in cases where combining the number change of polygon mirror use-surfaces and the number change of light sources, the priority is given to a combination, in which the number of light sources does not become odd number.

3. The image forming apparatus of claim 2, wherein the image forming apparatus forms an image on a sheet and fixes the formed image, and wherein the control section determines the image formation speed based on a kind of the sheet.

4. An image forming method for forming an image with a image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming method comprising:
determining an image formation speed that corresponds to a driving speed of the image carrier to be driven in the sub scanning direction;

changing a combination of a number of light sources to be used for a drive to emit the plurality of light beams and a number of polygon mirror use-surfaces used for a scanning with the light beams in the main scanning direction, based on the determined image formation speed; and changing the driving speed of the image carrier in the sub scanning direction to the driving speed of the image carrier to be driven;

wherein when combining the number change of polygon mirror use-surfaces and the number change of light sources, the priority is given to a combination, in which the number of light sources does not become odd number.

5. The image forming method of claim 4, wherein when a plurality of combinations exist to the same image formation speed, priority is given to the change of the number of polygon mirror use-surfaces.

6. The image forming method of claim 4, wherein the image forming apparatus forms an image on a sheet and fixes the formed image, and wherein the control section determines the image formation speed based on a kind of the sheet.

7. A computer-readable medium having computer-executable instructions for performing an image forming method of forming an image with a image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming method comprising:

determining an image formation speed that corresponds to a driving speed of the image carrier to be driven in the sub scanning direction;

changing a combination of a number of light sources to be used for a drive to emit the plurality of light beams and a number of polygon mirror use-surfaces used for a scanning with the light beams in the main scanning direction, based on the determined image formation speed; and changing the driving speed of the image carrier in the sub scanning direction to the driving speed of the image carrier to be driven;

wherein when combining the number change of polygon mirror use-surfaces and the number change of light sources, the priority is given to a combination, in which the number of light sources does not become odd number.

8. An image forming apparatus which performs an exposure of a plurality of line images concurrently, by scanning an image carrier with a plurality of light beams in a main scanning direction and simultaneously drives the image carrier in a sub scanning direction which is perpendicular to the main scanning direction, the image forming apparatus comprising:

a plurality of light sources to generate the plurality of light beams, which are driven to emit the plurality of light beams corresponding to image data a polygon mirror configured to deflect the plurality of light beams emitted from the plurality of light sources in a main scanning direction; and a control section which determines an image formation speed and switches, based on the determined image formation speed, a control between a control of changing a number of light sources used for light emission drive and a control of changing a number of polygon mirror use-surfaces used for a scanning with the light beams in the main scanning direction;

wherein the number of the plurality of light sources is multiples of 2, the number of polygon mirror use-surfaces is multiples of 3, and wherein the control-section decreases the number of the plurality of light sources to be driven in a case where the image formation speed is determined to be set at $1/2$, and decreases the number of polygon mirror use-surfaces in a case where the image formation speed is determined to be set at $1/3$.

9. The image forming apparatus of claim 8, wherein the control section determines the number of light sources or the number of polygon mirror use-surfaces based on the determined image formation speed.

10. The image forming apparatus of claim 8, wherein the image forming apparatus forms an image on a sheet and fixes the formed image, and wherein the control section determines the image formation speed based on a kind of the sheet.

* * * * *